United States Patent [19]

Durham

[11] 4,173,129

[45] Nov. 6, 1979

[54] UNIVERSAL JOINT STRUCTURE WITH IMPROVED SEAL

[75] Inventor: Donald F. Durham, Peoria, Ill.

[73] Assignee: Caterpillar Tractor Co., Peoria, Ill.

[21] Appl. No.: 895,889

[22] Filed: Apr. 13, 1978

[51] Int. Cl.² .............................................. F16D 3/26
[52] U.S. Cl. .................................. 64/17 A; 64/17 R; 277/205; 277/206 R
[58] Field of Search ............. 64/17 R, 17 A; 277/205, 277/206, 189

[56] References Cited

U.S. PATENT DOCUMENTS

| | | | |
|---|---|---|---|
| 2,209,854 | 7/1940 | Slaght | 64/17 A |
| 2,338,169 | 1/1944 | Dunn | 64/17 R |
| 2,991,634 | 7/1961 | Daley | 64/21 |
| 3,588,129 | 6/1971 | Pitner | 64/17 R |
| 3,633,383 | 1/1972 | Kleinschmidt | 64/17 R |
| 3,635,535 | 1/1972 | Schultenkamper | 64/17 A |
| 3,779,039 | 12/1973 | Schultenkamper | 64/17 A |
| 3,841,718 | 10/1974 | Reinsma | 277/206 |
| 3,846,995 | 11/1974 | Mangiavacchi | 64/17 R |
| 3,937,035 | 2/1976 | Fisher | 64/17 A |

FOREIGN PATENT DOCUMENTS

| | | | |
|---|---|---|---|
| 1123410 | 9/1956 | France | 64/17 A |
| 1001170 | 8/1965 | United Kingdom | 64/17 A |

Primary Examiner—Charles J. Myhre
Assistant Examiner—R. C. Turner
Attorney, Agent, or Firm—Wegner, Stellman, McCord, Wiles & Wood

[57] ABSTRACT

An improved seal for use in a universal joint structure. The seal includes a C-shaped seal ring which is loaded into sealing engagement with an associated bearing cap by a load ring compressively nested within the C-shaped seal ring. The leg of the seal ring sealingly engages the bearing cap under a controlled load to provide an improved oil seal. The arrangement of the seal is coordinated with the allowable play of the trunions of the joint structure so as to assure positive sealing engagement of the seal ring as a result of the loading of the load ring over the entire range of play movement permitted in the joint structure. The trunions may be journaled in the bearing caps by suitable roller bearings which may effectively further limit the play so as to limit sliding movement as well as axial deflection of the seal rings for further improved sealing in the joint structure. In one form the leg of the seal ring sealingly engaging the bearing cap has an effective sealing engagement therewith of approximately one half the radial extent of the leg.

13 Claims, 4 Drawing Figures

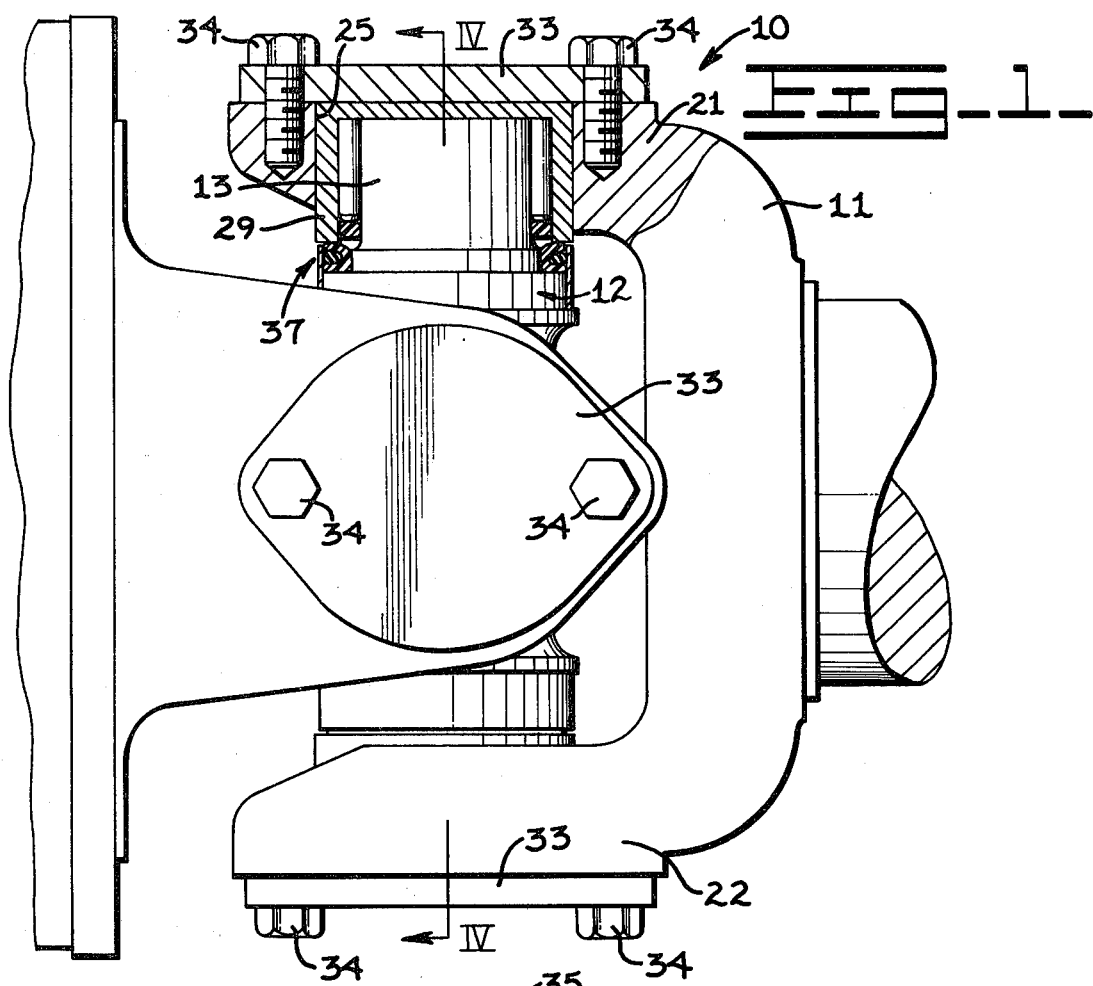
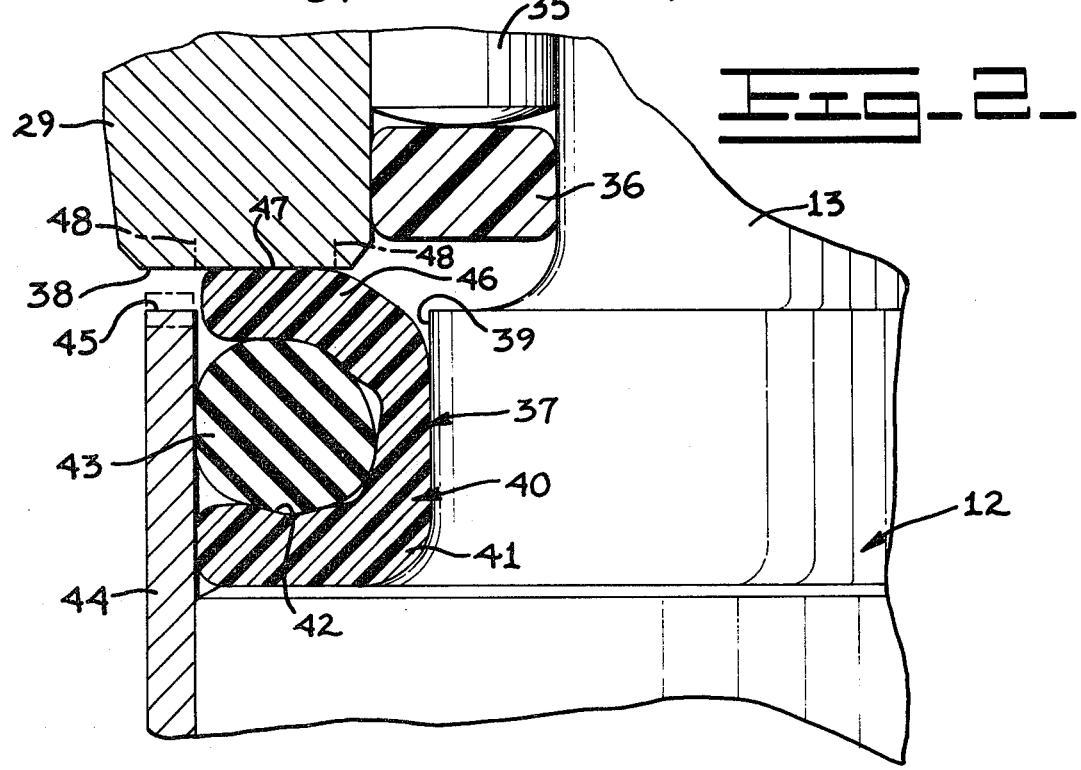

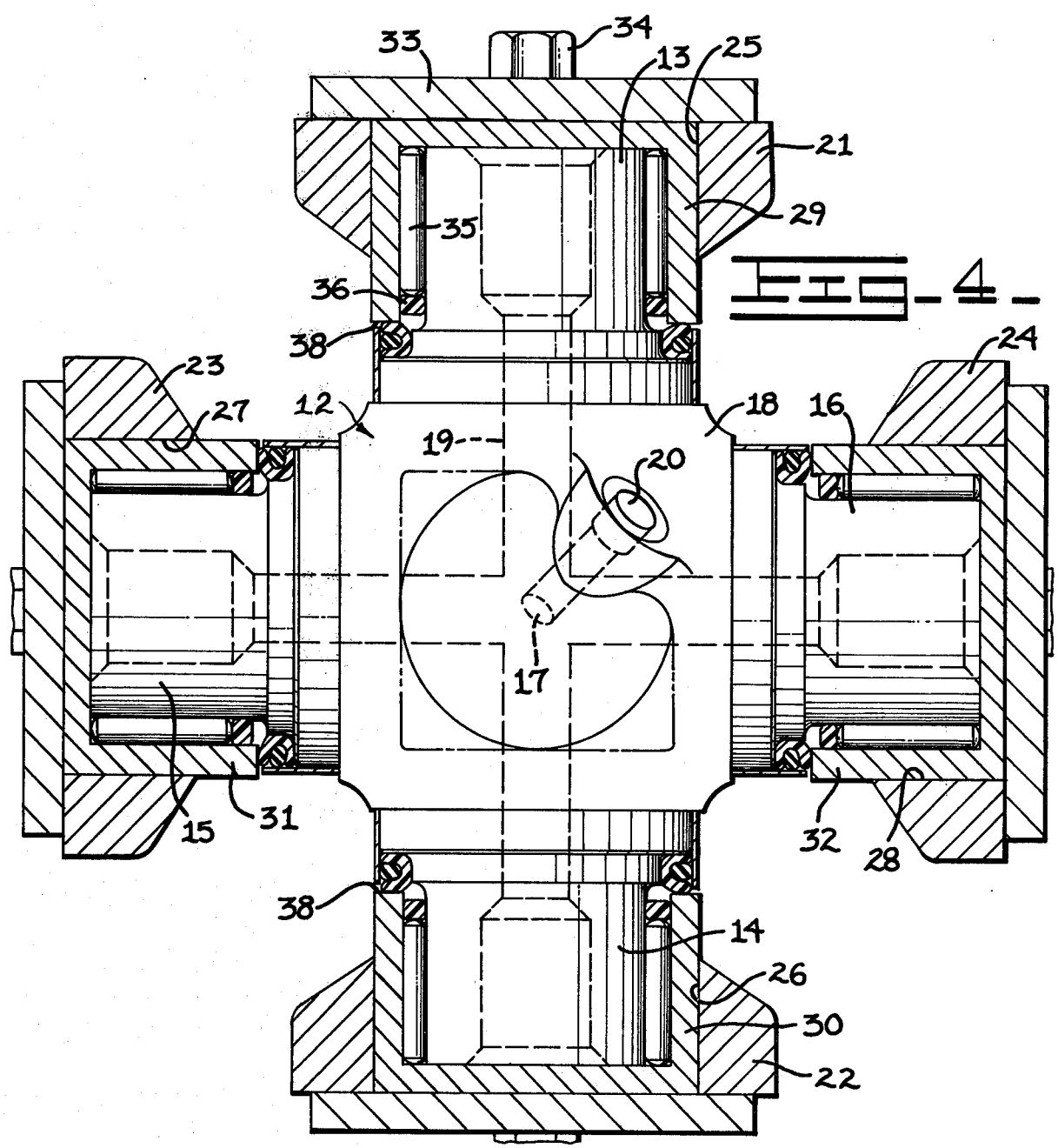

UNIVERSAL JOINT STRUCTURE WITH IMPROVED SEAL

BACKGROUND OF THE INVENTION

1. Field of the Invention

This invention relates to universal joint structures and in particular to improved oil seals for use therein.

2. Description of the Prior Art

In U.S. Pat. No. 2,338,169 of George E. Dunn, a universal joint seal is shown wherein a ball-shaped bearing sleeve is provided around each trunnion with cylindrical rollers between the trunnion surface and the sleeve. An annular ferrule on the trunnion base includes a sleeve portion spaced radially from the trunnion surface and from the outer spherical ball surface at the end of the bearing sleeve. A resilient rubber-like sealing ring is retained within and by the sleeve portion of the ferrule with a compressed portion thereof in sealing contact with the outer spherical surface of the ball.

In U.S. Pat. No. 2,991,634 of Frank R. L. Daley, Jr., a universal joint centering device is disclosed utilizing an annular seal and retainer combination for protecting the interior of the tubular extension and socket means of the device.

Hans-Jaochim Kleinschmidt shown, in U.S. Letters Pat. No. 3,633,383, a universal shaft wherein the seal includes a sealing ring and a scraper ring located adjacent and coaxial to one another, with the scraper ring having a scraping end facing outwardly.

Josef Schultenkamper shows, in U.S. Pat. No. 3,635,535, a universal joint having a seal between the trunnion and bushing.

Harold L. Reinsma, in U.S. Pat. No. 3,841,718, which patent is owned by the assignee hereof, shows a seal for a track linkage wherein a load ring is provided within a crescent-shaped seal having a driving flange, a sealing flange, and a thin flexible hinge section connecting the two flanges. The load ring presses the driving flange into an interference fit with the counterbore walls to cause the driving torque to be transmitted through the seal ring. The arrangement permits the seal ring material to be selected primarily for abrasion, torsional and rotary sealing characteristics without regard to the spring characteristics thereof, while the load ring can be selected primarily for good spring characteristics.

SUMMARY OF THE INVENTION

The present invention comprehends an improved universal joint structure wherein the end play characteristics of the structure are coordinated with the construction of the seal so as to provide an improved oil sealing therein.

The structure is arranged to have a leg portion of a C-shaped seal ring thereof urged into sealing engagement with the bearing cap journaling the trunnion over a substantial portion of the length of the leg. In the illustrated embodiment, the leg has sealing engagement with the end surface of the bearing cap so as to provide a substantially improved oil seal in the universal joint structure.

The load ring is preselected so as to provide the desired sealing engagement of the seal ring leg with the bearing cap over the entire range of end play movement of the trunnions, thereby to assure a positive seal under all normal operating conditions of the universal joint structure.

The trunnions are disposed relative to the bearing cap to have only limited axial play, thereby minimizing the amount of distortion of the seal ring in maintaining the desired seal over the entire play range.

The trunnions may be journaled in the bearing caps in suitable roller bearings so as to effectively minimize the play perpendicular to the trunnions, thereby effectively minimizing the sliding movement of the seal ring leg relative to the bearing cap and, thus, further effecting improved positive sealing in the joint structure.

The seal leg may have a frustoconical configuration in the free extension thereof with the sealing surface of the leg being brought to a planar configuration in sealing engagement with a complementary planar end surface of the bearing cap in the installed arrangement of the seal in the universal joint. Thus, the seal may have a substantial flat surface engagement with the bearing cap under the urging action of the load ring which sealing surface is effectively maintained throughout the range of play movement of the trunnions in the bearing caps in the normal operation of the universal joint structure.

The joint structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary side elevation of a universal joint structure embodying the invention with portions broken away to facilitate illustration of the invention;

FIG. 2 is a fragmentary enlarged diametric section of a portion of the joint structure illustrating in greater detail the construction of the oil seal means thereof;

FIG. 3 is a radial section of the annular seal ring in free extension disposition; and FIG. 4 is a transverse section taken substantially along the line 4—4 of FIG. 1.

DESCRIPTION OF THE PREFERRED EMBODIMENT

In the exemplary embodiment of the invention as disclosed in the drawing, a universal joint structure generally designated 10 is shown to comprise a pair of yokes 11 and a member 12 which may effectively comprise four outwardly extending trunnions 13, 14, 15 and 16 spaced 90° about a rotational axis 17 of the member 12. As shown in FIG. 4, member 12 includes a center portion 18 mounting the respective trunnions and provided with oil delivery passages 19 opening outwardly through the respective trunnions. A connector 20 is provided for introducing lubricating oil through the passages 19 to the trunnions.

Yoke 11 defines four corresondingly 90°-spaced arm portions 21, 22, 23 and 24. Arm 21 is provided with a through bore 25, arm 22 is provided with a through bore 26, arm 23 is provided with a through bore 27, and arm 24 is provided with a through bore 28. A first bearing cap 29 is received in bore 25, a second bearing cap 30 is received in through bore 26, a third bearing cap 31 is received in through bore 27, and a fourth bearing cap 32 is received in through bore 28. Each of the bearing caps is retained against movement outwardly from the bore by a retainer plate 33 secured to the arm portion by suitable threaded securing means, such as bolts, 34.

As further shown in FIG. 4, each of the trunnions is journaled in the cup-shaped bearing caps by a plurality of cylindrical roller bearings 35 and an annular bearing retainer 36.

Referring now more specifically to FIGS. 2 and 3, the more specific construction of the sealing means generally designated 37 associated with each of the trunnions is illustrated relative to the sealing means associated with trunnions 13, it being understood that the description is equally pertinent to each of the other sealing means. Thus, as shown in FIG. 2, each sealing means is defined by an annular planar end surface 38 of the cup-shaped bearing cap which confronts an annular corner recess 39 on the member 12 outwardly of the trunnion portion 13. A seal assembly generally designated 40 is received in the recess 39 and includes an annular seal ring 41 having a generally C-shaped radial cross section. Compressively nested within the radially outwardly opening recess 42 of the seal ring is a load ring 43. The seal assembly 40 is retained in the recess by a retaining ring 44 mounted to the yoke member 12 so as to radially outwardly overlie the recess and provide a loading force against the load ring 43, as best seen in FIG. 2. The distal end 45 of the retaining ring 44 is spaced adjacent the bearing cap surface 38.

Referring more specifically to FIG. 3, the seal ring 41 in the free extension thereof, i.e. in the arrangement prior to installation in the joint structure is generally C-shaped in cross section having a first leg 46 which is generally frustoconical and defines an outer frustoconical sealing surface 47. The seal ring may be formed of a suitable synthetic resin, such as a polyurethane elastomer of the type disclosed in the above-identified Reinsma U.S. Pat. No. 3,841,718, owned by the assignee hereof. Similarly, the load ring may be formed of a suitable resilient material, such as rubber. As further indicated in said Reinsma patent, an excellent formulation for the load ring may comprise a blend of 50 percent natural rubber and 50 percent polybutadiene rubber. Broadly, the seal ring is preferably formed of a tough, abrasion-resistant material with the load ring being formed of an elastomeric material having good spring characteristics over a wide temperature range.

The invention comprehends the "cooperative arrangement" of the sealing surface 38 and corner surface 39, and the disposition of the retaining ring 44 so as to cause the seal assembly 40 to have a sealing configuration, as shown in FIG. 2 in full lines, in the middle position of the trunnions relative to the axial play thereof in the opposed bearing caps, such as the trunnions 13 and 14 in bearing caps 29 and 30 and the trunnions 15 and 16 in the bearing caps 31 and 32.

As shown in FIG. 2, the axial play permits the movement of the yoke member 12 to opposite extremes, as shown in dotted lines relative to the disposition of the retainer ring end surface 45 and relative to the dotted lines 48 perpendicularly thereto.

Dotted lines 48 illustrate the maximum sliding movement of the seal ring sealing surface 47 relative to the end cap surface 38 permitted by the axial play of the trunnions 15 and 16 in the bearing caps 31 and 32, whereas the dotted line limits of the end surface 45 of retaining ring 44 illustrate the maximum range of deflection of the seal ring leg 46 as a result of axial play of the trunnions 13 and 14 in bearing caps 29 and 30. The characteristics of the load ring 43 is coordinated with the loading force generated by the retainer 44 thereagainst, and the configuration of the recess 42 so as to effectively maintain the sealing surface 47 in sealing engagement with the bearing cap and surface 38 over the entire axial ranges discussed above. As shown in FIG. 2, the extent of the sealing area between surface 47 and surface 38 will vary in response to the end play movement of the trunnions with the load ring having sufficient resiliency to maintain a load range at the seal surface of approximately 30 to 70 pounds. Thus, an improved oil seal is provided by the seal assembly 40 between the bearing caps and the yoke member 12 with respect to each of the trunnions 13, 14, 15 and 16, thereby effectively maintaining desired lubrication of each of the trunnions in normal operation of the universal joint structure 10.

Servicing of the seal assembly 40 is extremely simple. The user need merely remove the retainer 33, thereby permitting axial withdrawal of the bearing cap, which contains bearings 35 and retainer 36, then remove the seal ring 40.

As further shown in FIG. 2, the bearings 35 effectively limit the axial play of the trunnions at right angles to the trunnion 13 and, thus, as each of the trunnions is provided with similar such bearings, axial play is further limited in the entire universal joint structure for further improved control of the oil seals.

Thus, the coordinated permitted axial play of the opposed pairs of trunnions in the corresponding bearing caps and the improved arrangement of the seal assembly utilizing the sealing portions generated by the load rings 43 in effectively maintaining a maximum surface-to-surface sealing engagement between the seal ring and the bearing cap end surfaces provides a substantially improved oil seal in the universal joint structure eliminating the serious problems of conventional universal joint structures wherein failure of the joint occurs due to impositive sealing of the lubricating oil therein. The sealing means of the present invention is extremely simple of construction and provides for facilitated servicing when desired.

In one form, the leg 46 of the seal ring 40, sealingly engaging the bearing cap, has an effective sealing engagement therewith, of up to approximately one half the radial extent of the leg.

The foregoing disclosure of specific embodiments is illustrative of the broad inventive concepts comprehended by the invention.

The embodiments of the invention in which an exclusive property or privilege is claimed are defined as follows:

1. In a universal joint structure having a yoke carrying first and second inwardly opposed coaxial bearing caps defining inner annular end surfaces, and a member having first and second outwardly opposed coaxial trunnions journaled respectively in said first and second bearing caps, said trunnions having a preselected axial play in said bearing caps, the improvement comprising:

means on said member and said bearing caps cooperatively defining a first annular seal space adjacent said first bearing cap and a second seal space coaxial of said trunnions adjacent said second bearing cap;

a first annular seal ring in said first seal space having a C-shaped cross section opening away from the axis of said trunnions, one radially extending leg of the seal ring being juxtaposed to the annular end surface of said first bearing cap with a force of approximately 30 to 70 pounds;

a first annular load ring compressed within said C-shaped seal ring and urging said one leg of the seal ring sealingly against said annular end surface of said first bearing cap;

a second annular seal ring in said second seal space having a C-shaped cross section opening away from the axis of said trunnions, one radially extending leg of said second seal ring being juxtaposed to the annular end surface of said first bearing cap;

a second annular load ring compressed within said second C-shaped seal ring and urging said one leg of the second seal ring sealingly against said annular end surface of said second bearing cap with a force of approximately 30 to 70 pounds; and retainer means for loading said load rings to cause the radially extending legs to be sealingly engaged with said end surfaces and the seals to be sealingly engaged with said member inwardly of said trunnions over the entire range of axial play movement of said trunnions in said bearing caps, thereby to define an effective oil seal between said member and bearing caps.

2. The universal joint structure of claim 1 wherein said retainer is fitted to said member.

3. The universal joint structure of claim 1 wherein said retainer comprises an annular element fitted to said member coaxially of said trunnions.

4. The universal joint structure of claim 1 wherein roller bearings are provided in said bearing caps for journaling the trunnions therein.

5. The universal joint structure of claim 1 wherein said one leg of each said seal ring is substantially frusto-conical in free extension thereof.

6. The universal joint structure of claim 1 wherein said bearing cap end surfaces are planar and said one leg of each said seal ring defines a planar surface in sealing engagement with said end surfaces.

7. In a universal joint structure having a yoke carrying first and second inwardly opposed coaxial bearing caps defining inner annular end surfaces, and a member having first and second outwardly opposed coaxial trunnions journaled respectively in said first and second bearing caps, said trunnions having a preselected axial play in said bearing caps, the improvement comprising:

means on said member and said bearing caps cooperatively defining a first annular seal space adjacent said first bearing cap and a second seal space coaxial of said trunnions adjacent said second bearing cap;

a first annular seal ring in said first seal space having a C-shaped cross section opening away from the axis of said trunnions, one radially extending leg of the seal ring being juxtaposed to the annular end surface of said first bearing cap with a force of approximately 30 to 70 pounds;

a first annular load ring compressed within said C-shaped seal ring and urging said one leg of the seal ring sealingly against said annular end surface of said first bearing cap;

a second annular seal ring in said second seal space having a C-shaped cross section opening away from the axis of said trunnions, one radially extending leg of said second seal ring being juxtaposed to the annular end surface of said first bearing cap;

a second annular load ring compressed within said second C-shaped seal ring and urging said one leg of the second seal ring sealingly against said annular end surface of said second bearing cap with a force of approximately 30 to 70 pounds; and retainer means for loading said load rings to cause up to approximately one-half of the radial extent of said one leg of the seal rings to be sealingly engaged with said end surfaces and the seals to be sealingly engaged with said member inwardly of said trunnions over the entire range of axial play movement of said trunnions in said bearing caps, thereby to define an effective oil seal between said member and bearing caps.

8. The universal joint structure of claim 7 wherein siad one leg of each said seal ring is substantially frusto-conical in free extension thereof.

9. The universal joint structure of claim 7 wherein said bearing cap end surfaces are planar and said one leg of each said seal ring defines a planar surface in sealing engagement with said end surfaces.

10. In a universal joint structure having a yoke carrying first and second inwardly opposed coaxial bearing caps defining inner annular end surfaces, and third and fourth inwardly opposed coaxial bearing caps defining inner annular end surfaces, said third and fourth bearing caps being aligned perpendicularly to the axial alignment of the first and second bearing caps, and a member having first and second outwardly opposed coaxial trunnions journaled respectively in said first and second bearing caps, and third and fourth outwardly opposed coaxial trunnions journaled respectively in said third and fourth bearing caps, said trunnions having a preselected axial play in said bearing caps, the improvement comprising:

means on said member and said first and second bearing caps cooperatively defining a first annular seal space adjacent said first bearing cap and a second seal space coaxially of said first and second trunnions adjacent said second bearing cap;

a first annular seal ring in said first seal space having a C-shaped cross section opening away from the axis of said trunnions, one radially extending leg of the seal ring being juxtaposed to the annular end surface of said first bearing cap;

a first annular load ring compressed within said C-shaped seal ring and urging said one leg of the seal ring sealingly against said annular end surface of said first bearing cap with a force of approximately 30 to 70 pounds;

a second annular seal ring in said second seal space having a C-shaped cross section opening away from the axis of said first and second trunnions, one radially extending leg of said second seal ring being juxtaposed to the annular end surface of said second bearing cap;

a second annular load ring compressed within said second C-shaped seal ring and urging said one leg of the second seal ring sealingly against said annular end surface of said second bearing cap with a force of approximately 30 to 70 pounds;

retainer means for loading said load rings to cause up to approximately one-half of the radial extent of said one leg of the seal rings to be sealingly engaged with said end surfaces and the seal rings to be sealingly engaged with said member inwardly of said first and second trunnions over the entire range of axial play movement of said first and second trunnions in said bearing caps, thereby to define an effective oil seal between said member and bearing caps;

means on said member and said third and fourth bearing caps cooperatively defining a third annular seal space adjacent said third bearng cap and a fourth annular seal space coaxially of said third and fourth trunnions adjacent said fourth bearing cap;

a third annular seal ring in said third seal space having a C-shaped cross section opening away from the axis of said third and fourth trunnions, one radially extending leg of the seal ring being juxtaposed to the annular end surface of said third bearing cap;

a third annular load ring compressed within said third C-shaped seal ring and urging said one leg of the third seal ring sealingly against said annular end surface of said third bearing cap with a force of approximately 30 to 70 pounds;

a fourth annular seal ring in said fourth seal space having a C-shaped cross section opening away from the axis of said third and fourth trunnions, one radially extending leg of said fourth seal ring being juxataposed to the annular end surface of said fourth bearing cap;

a fourth annular load ring compressed within said fourth C-shaped seal ring and urging said one leg of the fourth seal ring sealingly against said annular end surface of said fourth bearing cap with a force of approximately 30 to 70 pounds; and retainer means for loading said third and fourth load rings to cause up to approximately one-half of the radial extent of said one leg of the third and fourth seal rings to be sealingly engaged with said end surfaces and the third and fourth seal rings to be sealingly engaged with said member inwardly of said third and fourth trunnions over the entire range of axial play movement of said third and fourth trunnions in said third and fourth bearing caps, thereby to define an effective oil seal between said member and said third and fourth bearing caps.

11. The universal joint structure of claim 10 wherein said member includes oil passages for feeding oil to each of said bearing caps to be retained therein by said seal rings.

12. The universal joint structure of claim 10 wherein roller bearings are provided in each of said bearing caps for journaling the trunnions therein and effectively limiting axial play of the trunnions.

13. The universal joint structure of claim 10 wherein removable means are secured to said yoke for preventing axially outward movement of said bearing caps to limit the axial play of said trunnions therein.

* * * * *

UNITED STATES PATENT AND TRADEMARK OFFICE
CERTIFICATE OF CORRECTION

PATENT NO. : 4,173,129

DATED : November 6, 1979

INVENTOR(S) : DONALD F. DURHAM

It is certified that error appears in the above-identified patent and that said Letters Patent are hereby corrected as shown below:

Claim 1, column 4, lines 67 and 68, cancel the wording "with a force of approximately 30 to 70 pounds" after "cap";

column 5, line 4, after "cap", insert --with a force of approximately 30 to 70 pounds--;

column 5, line 9, after "said" cancel "first" and substitute therefor --second--.

Claim 7, column 5, lines 55 and 56, cancel the wording "with a force of approximately 30 to 70 pounds" after "cap";

column 5, line 60, after "cap" insert --with a force of approximately 30 to 70 pounds--;

column 5, line 65, after "said" cancel "first" and substitute therefor --second--.

Signed and Sealed this

Seventeenth Day of November 1981

[SEAL]

*Attest:*

*Attesting Officer*

GERALD J. MOSSINGHOFF

*Commissioner of Patents and Trademarks*